United States Patent [19]
Ritchey

[11] Patent Number: 6,024,143
[45] Date of Patent: Feb. 15, 2000

[54] CUTTING TOOTH ASSEMBLY

[75] Inventor: Cary D. Ritchey, Curryville, Pa.

[73] Assignee: Kennametal Inc., Latrobe, Pa.

[21] Appl. No.: 09/273,936

[22] Filed: Mar. 22, 1999

[51] Int. Cl.$^7$ .................................................. A01G 23/06
[52] U.S. Cl. ......................... 144/24.12; 37/302; 37/452;
37/455; 144/241; 144/337; 299/85.2; 299/109;
407/44; 407/81; 83/840; 83/855; 83/841
[58] Field of Search ............................ 37/302, 455, 452,
37/454; 144/24.12, 337, 241; 299/74, 79,
85.2, 101, 102, 103, 113, 109; 407/44,
47, 51, 66, 71, 81; 83/840, 855, 841

[56] References Cited

U.S. PATENT DOCUMENTS

| | | | |
|---|---|---|---|
| 2,078,475 | 4/1937 | Welter | 407/81 |
| 2,121,044 | 6/1938 | Noble | 299/103 |
| 4,316,636 | 2/1982 | Taylor et al. | 299/109 |
| 4,335,921 | 6/1982 | Swisher, Jr. et al. | 299/103 |
| 4,727,664 | 3/1988 | Hemphill | 37/455 |
| 4,744,278 | 5/1988 | Wright | 407/51 |
| 4,827,995 | 5/1989 | Wilson | 144/241 |
| 4,998,574 | 3/1991 | Beach et al. | 144/241 |
| 5,005,622 | 4/1991 | Beach et al. | 144/241 |
| 5,007,685 | 4/1991 | Beach et al. | 299/85.2 |
| 5,261,306 | 11/1993 | Morey et al. | 144/241 |
| 5,743,314 | 4/1998 | Puch | 144/24.12 |

OTHER PUBLICATIONS

Kennametal Drawing 84201510R03 (dated Sep. 9, 1997).
Kennametal Drawing 80101473R06 (dated Jul. 5, 1989).
Kennametal Drawing DEV–C–2743–3 (dated Apr. 2, 1990).
Vermeer advertisement for Stump Cutters (date unknown) [two pages].

*Primary Examiner*—W. Donald Bray
*Attorney, Agent, or Firm*—John J. Prizzi

[57] ABSTRACT

A cutter tooth assembly for impingement of a material (e.g., a stump, wood, brush or earth strata). The assembly attaches to a driven member (e.g., a rotatable wheel). The assembly includes a cutter tooth which has an elongate body with a leading end and a trailing end, as well as a hard insert at the leading end of the tooth. The assembly also includes a pocket which has a base portion and a holder portion. The pocket attaches to the wheel at the base portion thereof. The cutter tooth is retained to the pocket at the holder portion thereof. The base portion of the pocket has a leading surface and a trailing surface. The cutter tooth is retained by the holder portion of the pocket so that the hard insert extends circumferentially past the leading surface of the base portion of the pocket.

24 Claims, 8 Drawing Sheets

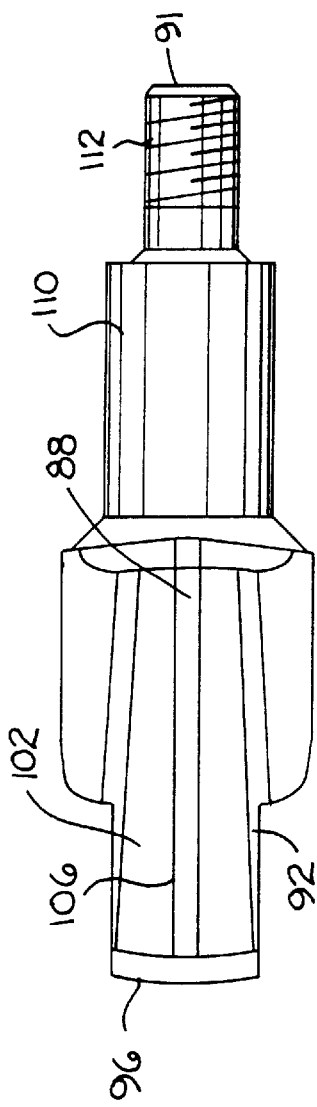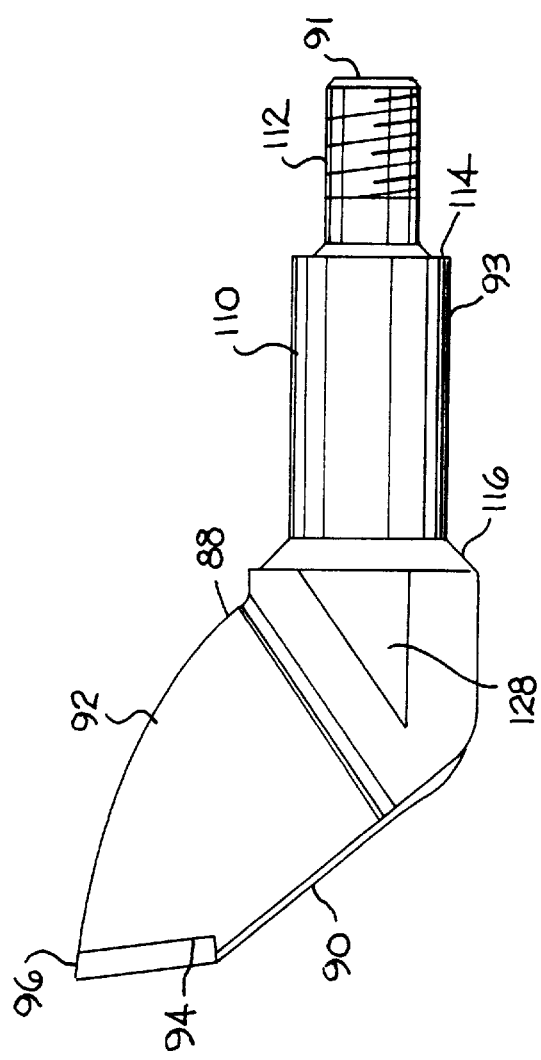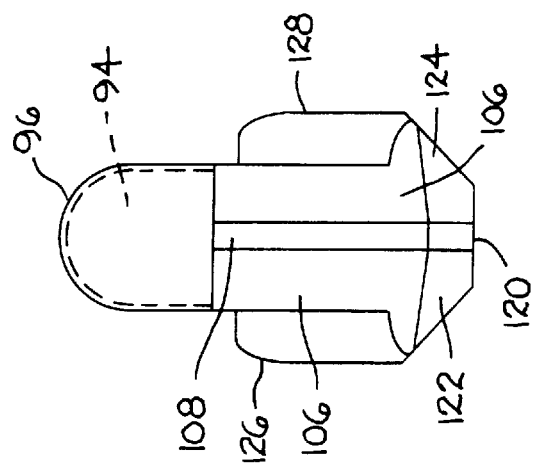

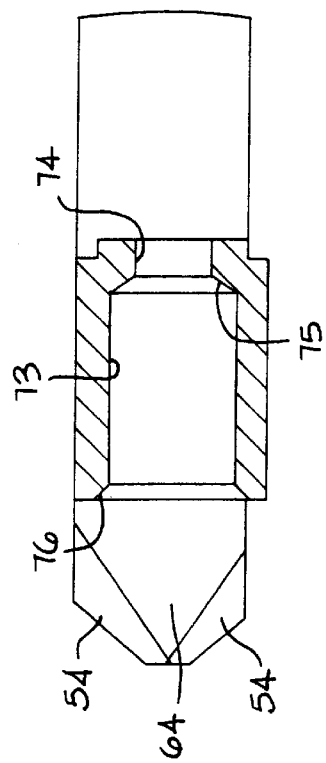
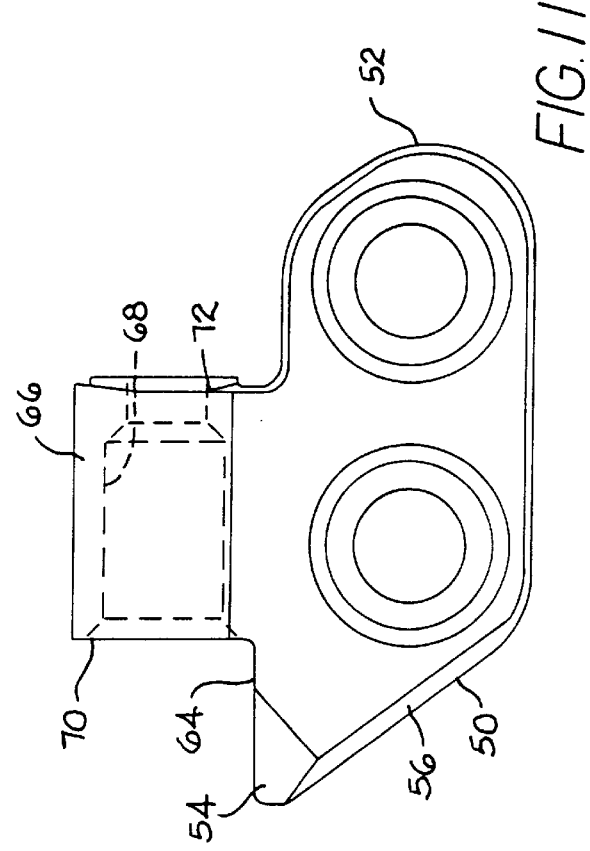
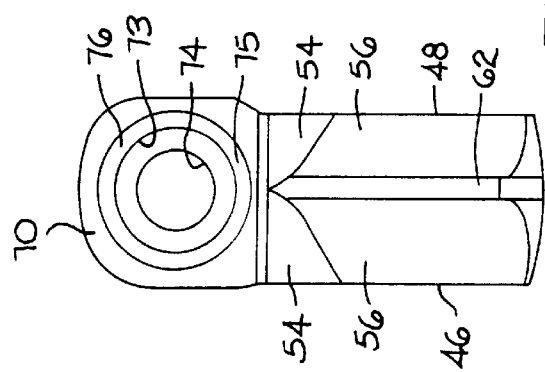

CUTTING TOOTH ASSEMBLY

BACKGROUND OF THE INVENTION

There are a number of machines that use teeth to impinge or disintegrate a piece of material and/or the earth strata. Examples of these machines include land clearing machines, tub grinders, force feed grinders, and stump grinding machines. As can be appreciated, these machines are used to cut or disintegrate wood and brush. Referring to the latter of the above-mentioned machines, i.e., stump grinding machines, these machines typically include a plurality of stump cutter teeth mounted to the circumference of a driven wheel. In a typical stump grinding operation, the stump grinding machine is positioned adjacent to the stump. The wheel then is rotated so as to drive the cutter teeth into the stump. After a plurality cuts (or passes) the end result is the disintegration of the stump to a predetermined depth below the surface of the ground.

It is very apparent that stump grinding places a tremendous amount of stress upon the stump cutter teeth, as well as upon the structure which supports each stump cutter tooth. The cutter teeth themselves must be strong and rugged so as to be able to withstand the stresses associated with the stump cutting operation. In addition, the holder assembly must also be also to withstand these same stresses and still hold the stump cutter tooth therein.

Earlier stump cutter assemblies are shown and described in U.S. Pat. No. 5,005,622 to Beach et al. (assigned to Kennametal Inc., the assignee of the present patent application) and U.S. Pat. No. 5,743,314 to Puch.

SUMMARY

In one form thereof, the invention is a cutter tooth assembly for impinging a material. The cutter tooth assembly attaches to a driven member which has a side surface and a circumferential surface. The assembly comprises a cutter tooth which has an elongate body with a leading end and a trailing end. A hard insert is at the leading end of the tooth. The cutter assembly further includes a pocket includes a base portion and a holder portion wherein the pocket attaches to the side surface of the driven member at the base portion thereof. The cutter tooth is retained to the pocket at the holder portion thereof. The base portion of the pocket has a leading surface and a trailing surface. The cutter tooth is retained by the holder portion of the pocket so that the hard insert extends circumferentially past the leading surface of the base portion of the pocket.

In another form, the invention is a cutter tooth assembly for attachment to a rotatable wheel which has a side surface and a circumferential surface. The assembly comprises a cutter tooth which has a hard insert. The assembly also has a pocket which is attachable to the side surface of the wheel. The pocket retains the cutter tooth. The cutter tooth is indexable to one of a plurality of positions relative to the pocket.

In still another form thereof, the invention is a pocket for holding a cutter tooth and being attachable to a driven member. The pocket comprises a base portion and a holder portion. The pocket is attachable to the driven member at the base portion thereof. The holder portion retains the cutter tooth. The base portion presents at least one external contact surface.

BRIEF DESCRIPTION OF THE DRAWINGS

The following is a brief description of the drawings that form a part of this patent application:

FIG. 8 is a side view of the stump cutter tooth of FIG. 2;

FIG. 9 is a front view of the stump cutter tooth of FIG. 4;

FIG. 10 is a top view of the stump cutter tooth of FIG. 4;

FIG. 11 is a side view of the pocket of FIG. 2;

FIG. 12 is a front view of the pocket of FIG. 7;

FIG. 13 is a top view of the pocket of FIG. 8 with a portion of the holder portion cut away to reveal the bore;

DETAILED DESCRIPTION

Figure 1:
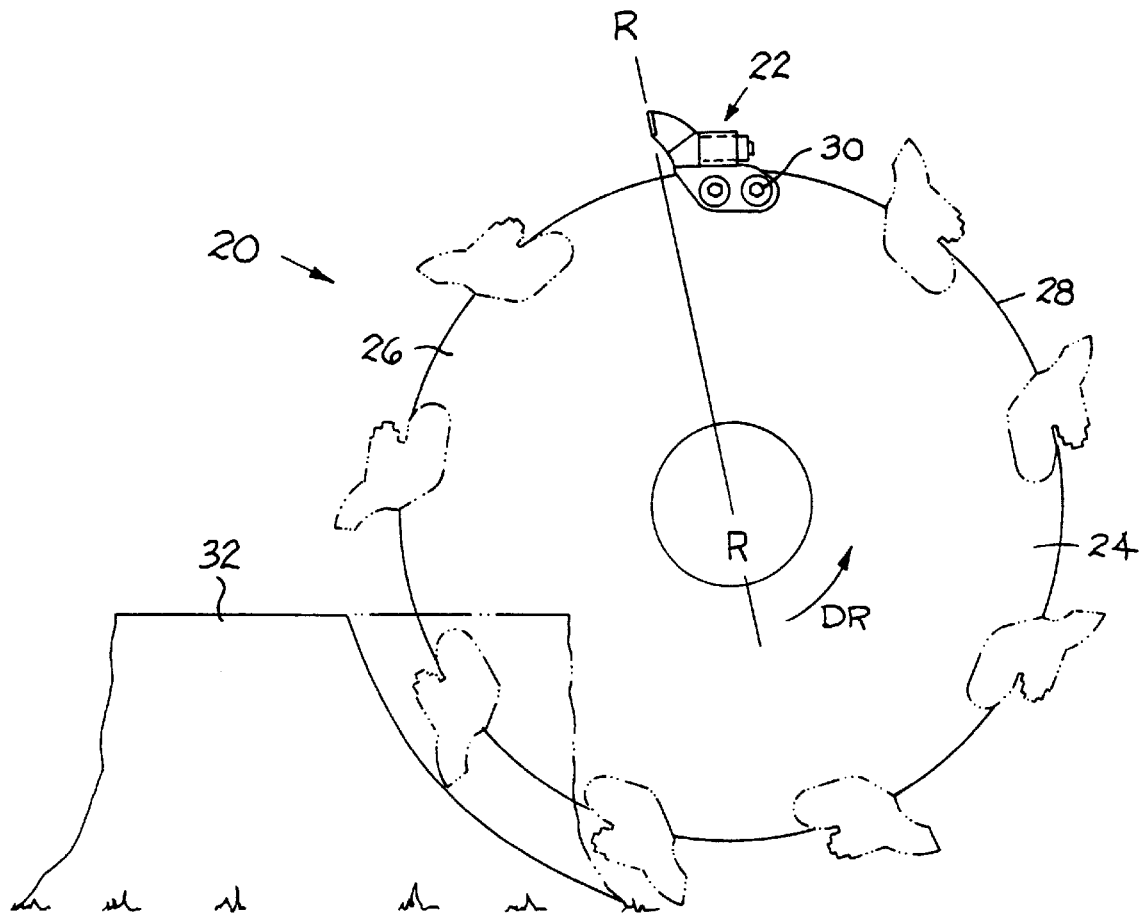
FIG. 1 is a mechanical schematic view of a stump cutter wheel and stump cutter teeth engaging a stump (or the substrate) in the process of disintegrating the stump.
Figure 2:
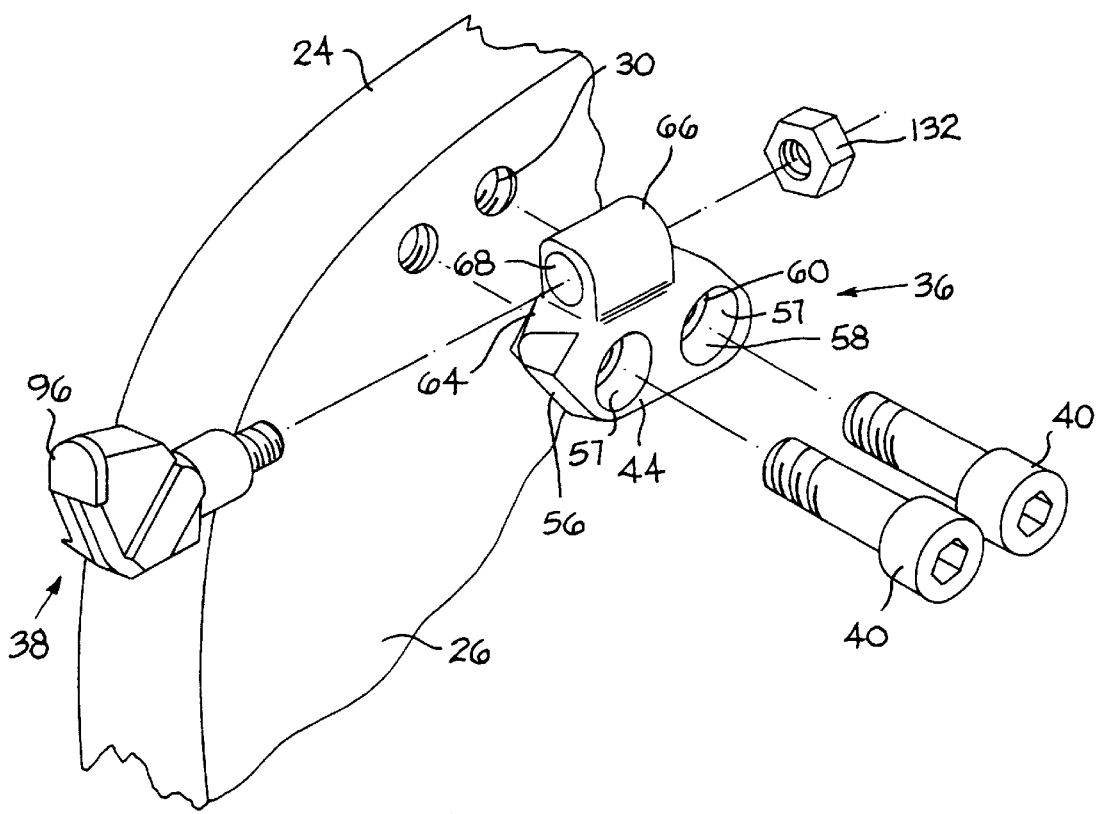
FIG. 2 is an isometric view of a specific embodiment of a stump cutter assembly and a portion of the driven wheel showing the components exploded apart.
Figure 4:
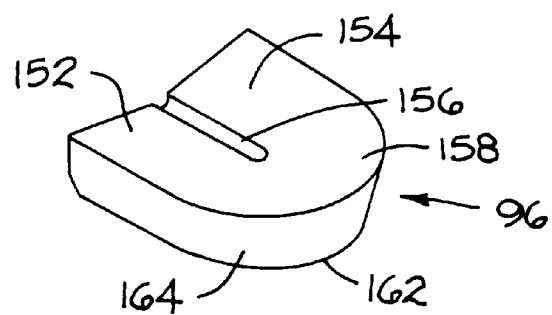
FIG. 4 is an isometric view of the hard insert of the stump cutter tooth assembly of FIG. 2.
Figure 5:
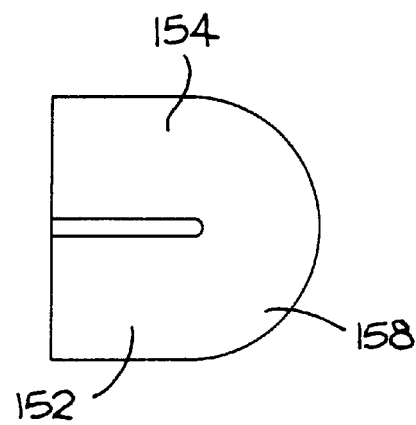
FIG. 5 is a rear view of the hard insert of FIG. 4.
Figure 6:
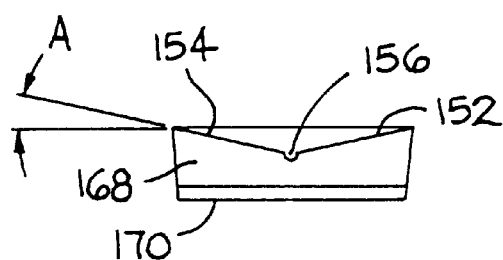
FIG. 6 is a bottom view of the hard insert of FIG. 4.
Figure 7:
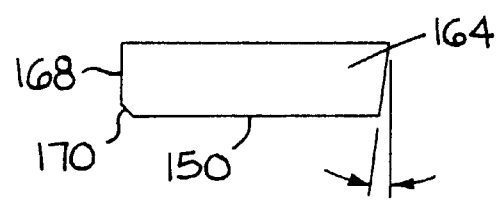
FIG. 7 is a side view of the hard insert of FIG. 4.

Referring to the drawings, FIG. 1 illustrates a stump grinder (or cutter) assembly which is generally designated as 20. Stump grinder assembly 20 includes a plurality of stump cutter tooth assemblies wherein each stump cutter tooth assembly is generally designated as 22. The stump grinder assembly further includes a wheel 24. The wheel 24 presents a pair of side surfaces wherein only one side surface 26 is illustrated and a circumferential edge 28. The wheel 24 contains a plurality of series (or pairs) of threaded holes 30 (see FIG. 2) which are spaced about the circumference 28 thereof. As will become apparent hereinafter, the cutter tooth assembly 22 is attached to the wheel 24 via these holes 30.

FIG. 1 further illustrates the stump cutter teeth engaging the stump (or substrate) 32 so as to disintegrate the stump 32. Typically the stump 32 is disintegrated to a predetermined depth below the surface of the ground.

The cutter tooth assembly 22 comprises a pocket 36 and a cutter tooth 38. Bolts 40 fasten the pocket 36 to the one surface 26 of the wheel 24 as will be described hereinafter.

Referring to FIGS. 3, 7, 8, and 9, as well as other drawings, pocket 36 includes a base portion 44 which has an interior surface 46 and an exterior surface 48. When the pocket 36 is assembled to the wheel 24, the interior surface 46 of the pocket is adjacent to the one side surface 26 of the wheel 24 and the exterior surface 48 of the pocket faces away from the wheel 24. The base portion 44 further includes a leading end 50 and a trailing end 52. The leading end 50 of the base portion 44 presents upper leading bevelled (or chamfered) surfaces 54 and lower leading bevelled (or chamfered) surfaces 56. A pair of holes 57 are in the pocket base 44. Each hole 57 has an exterior portion 58 and an interior portion 59 wherein a shoulder 60 separates the exterior and interior portions (58, 59) of the hole 57. The exterior portion 57 has a larger diameter than the diameter of the interior portion 58.

The upper leading bevelled surfaces 54 are on opposite sides of a central flat surface 62. The lower leading bevelled surfaces 56 are also on opposite sides of the central flat surface 62. The pocket 36 base portion 44 further presents an upper contact surface 64.

Pocket 36 further includes an integral holder portion 66. Holder portion 66 contains a bore 68. Holder portion 66 has a leading face 70 and a trailing face 72. Bore 68 includes a leading bore portion 73 and a trailing bore portion 74. The leading bore portion 73 is of a diameter that is larger then the diameter of the trailing bore portion 74. A bore shoulder 75, joins the leading and trailing bore portions (73, 74). A frusto-conical surface (or mouth) 76 surrounds the bore 68 at the leading face 70 of the holder portion 66.

Referring to FIGS. 3, 4, 5, and 6, as well as other drawings, cutter tooth 38 includes an elongate body 88 that presents a leading end 90 and a trailing end 91. A head portion 92 is at the leading and 90 of the body 88. A shank portion 93 is at the trailing end 91 of the body 88.

The head portion 92 contains a recess 94 that receives a hard insert 96. The hard insert 96 is illustrated as presenting a generally flat leading surface 150. The rear surface of the hard insert 96 has a lower portion comprising a pair of opposite bevelled surfaces 152, 154. These bevelled surfaces (152, 154) are disposed at an angle "A" with respect to the flat leading surface 150. The preferred angle "A" is about ten degrees. A radiused surface 156 joins the bevelled surfaces 152, 154. The rear surface of the hard insert 96 also has an upper portion 158. The hard insert 96 presents a generally arcuate cutting edge 162 which at the intersection of the leading surface 150 and the arcuate top edge 164. The top edge 164 is relieved at an angle "B" which preferably is about ten degrees. The bottom edge 168 of the hard insert 96 includes a chamfer 170. The recess 94 presents a surface with corresponds to the rear surface of the hard insert so that the hard insert securely attaches to the recess by brazing or the like.

The head portion 92 presents upper bevelled surfaces 102 which are on opposite sides of an upper central strip 104. The head portion 92 also presents lower bevelled surfaces 106 which are on opposite sides of a lower central strip 108.

The shank portion 93 includes a smooth portion 110 and a threaded portion 112 wherein a shank shoulder 114 separates the smooth and threaded portions (110 and 112). A frusto-conical shoulder 116 separates the head portion 92 and the shank portion 93.

The stump cutter tooth 38 includes a neutral contact surface 120, a lower interior contact surface 122, a lower exterior contact surface 124, an upper interior contact surface 126, and an upper exterior contact surface 128. The lower interior contact surface 122 and the lower exterior contact surface 124 are each disposed at an angle of about 45 degrees with respect to the surface of the neutral contact surface 120. The upper interior contact surface 126 and the upper exterior contact surface 128 are each disposed at an angle of about 90 degrees with respect to the surface of the neutral contact surface 120.

In the attachment of the pocket 36 to the one surface 48 of the wheel 24, the holes 57 of the pocket 36 are aligned with the corresponding holes 30 in the wheel 24. The bolt 40 are passed through their corresponding holes 57 in the pocket 36. Each bolt 40 engages the threads in the hole 30 so that upon rotation the bolt 40 moves so as to abut the shoulder 60 and then draw the pocket 36 into tight contact against the one surface 26 of the wheel 24. Although the specific embodiment shows that the pockets are bolted to the wheel, it should be appreciated that applicant contemplates that the pockets may be affixed to the wheel by other mechanical forms of attachment or by welding or the like.

In regard to the assembly of the cutter tooth 38 to the pocket 36, the shank portion 93 of the cutter tooth 38 is positioned in the bore 68 of the holder portion 66 to a point where the shoulder 114 of the shank 93 contacts the shoulder 75 of the holder bore 66. When in this position, the threaded shank portion 112 (or at least a part of the threaded shank portion 112) extends past the trailing face 72 of the holder 66. A nut 132 is threaded onto the threaded shank portion 112. The nut 132 is rotated until the cutter tooth 38 is very securely and tightly attached to the holder portion 66 of the pocket 36. To detach the cutter tooth 38 from the pocket 36, the nut 132 is removed from the threaded shank portion 112 and the cutter tooth removed from the bore 68 of the holder portion 66.

In operation, as shown in FIG. 1 the wheel of the stump grinding assembly is rotated so as to drive the stump cutter teeth into the stump so as to disintegrate the stump. As will described hereinafter, the stump cutter tooth assembly of the instant invention provides a number of advantages which improve the overall operational efficiency of the stump cutter tooth assembly.

Figure 14:
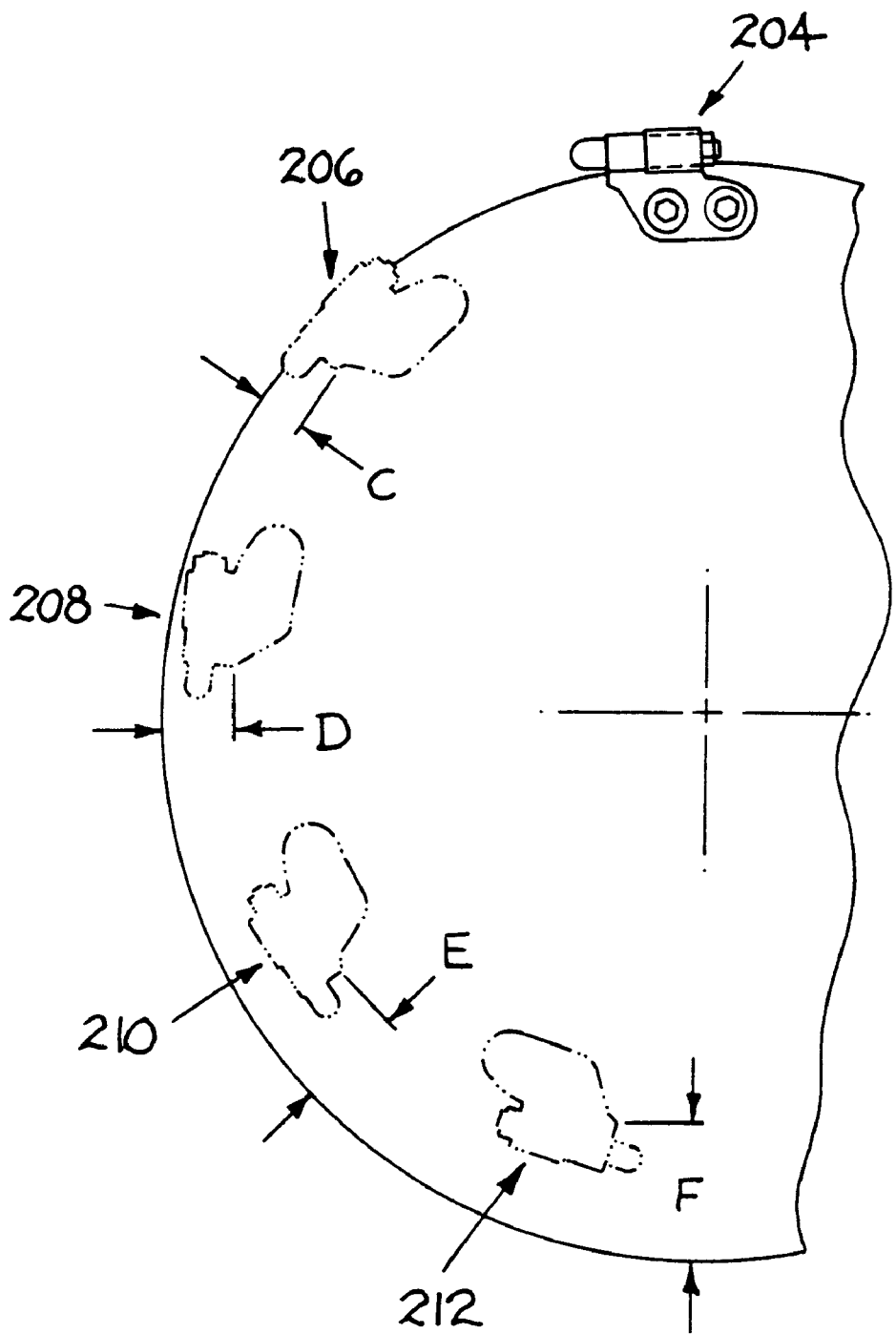
FIG. 14 is a mechanical schematic view of a portion of a stump cutter wheel showing a plurality of stump cutter tooth assemblies wherein each stump cutter tooth assembly is spaced in a different position with respect to the peripheral edge of the cutter wheel.

FIG. 14 illustrates an embodiment of a stump cutter wheel 200 wherein there are shown five stump cutter tooth assemblies (204, 206, 208, 210, 212) wherein each stump cutter tooth assembly is positioned at a different position relative to the peripheral edge of the stump cutter wheel. In each stump cutter tooth assembly the cutter tooth 38 is indexed to a selected one of a plurality of discrete positions relative to the pocket 36 as will be described hereinafter.

More specifically, stump cutter tooth assembly 204 has the upper contact surface of the pocket thereof even with the peripheral edge of the wheel. The cutter tooth is disposed 90 degrees toward the wheel. Stump cutter tooth assembly 206 has the upper contact surface of the pocket thereof disposed a distance "C" below the peripheral edge of the wheel. The cutter tooth is disposed 45 degrees toward the wheel. Stump cutter tooth assembly 208 has the upper contact surface of the pocket thereof disposed a distance "D" below the peripheral edge of the wheel. The cutter tooth is disposed parallel to, i.e., neutral with, the surface of the wheel. Stump cutter tooth assembly 210 has the upper contact surface of the pocket thereof disposed a distance "E" below the peripheral edge of the wheel. The cutter tooth is disposed 45 degrees away from the wheel. Stump cutter tooth assembly 212 has the upper contact surface of the pocket thereof disposed a distance "F below the peripheral edge of the wheel. The cutter tooth is disposed 90 degrees away from the wheel.

Figure 15:
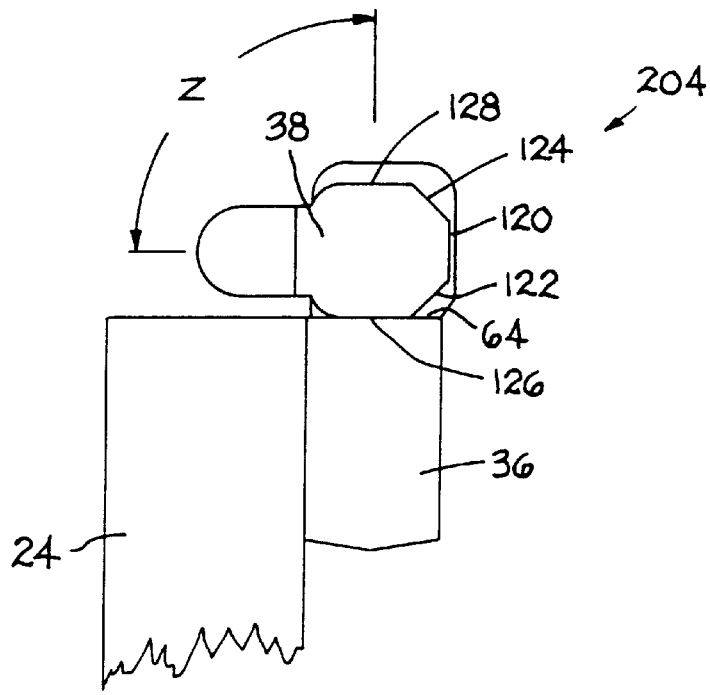
FIG. 15 is a mechanical schematic front view depicting of the stump cutter tooth assembly attached to the wheel wherein the cutter bit is indexed at an angle "z" of about 90 degrees toward the wheel and wherein the stump cutter assembly is positioned so that the upper contact surface of the pocket is even with the peripheral edge of the cutter wheel.

FIG. 15 illustrates the stump cutter tooth assembly 204. The stump cutter tooth 38 is in a position wherein the upper interior contact surface 126 is in contact with the upper contact surface 64 of the pocket 36. In this position, the central axis of the cutter tooth 38 is disposed at angle of "z" about 90 degrees with respect to the surface of the wheel (or the vertical as shown in the drawing). The contact between the upper interior contact surface 126 of the cutter tooth 38 and the upper contact surface 64 of the pocket 36 facilitates the stability and strength of the attachment of the cutter tooth to the pocket during the cutting operation. In this position one may consider the cutter tooth to be disposed toward the wheel at an included angle (i.e., "z") of about 90 degrees.

Figure 16:
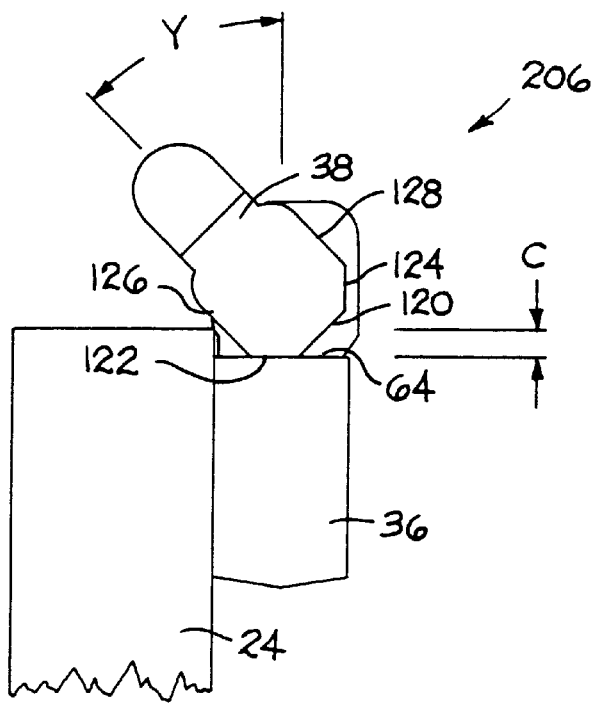
FIG. 16 is a mechanical schematic front view depicting the stump cutter assembly attached to the wheel wherein the cutter tooth is indexed at an angle "y" of about 45 degrees toward the wheel and wherein the stump cutter assembly is positioned so that the upper contact surface of the pocket is positioned the least distance below the peripheral edge of the cutter wheel of the set of five stump cutter assemblies depicted in FIG. 14.

FIG. 16 illustrates the stump cutter tooth assembly 206. The cutter tooth 38 is in a position wherein the lower interior contact surface 122 is in contact with the upper contact surface 64 of the pocket 36. In this position, the transverse axis of the cutter tooth 38 is disposed at angle of "y" about 45 degrees with respect to the surface of the wheel (or the vertical as shown in the drawing). The contact between the lower interior contact surface 122 of the cutter tooth 38 and the upper contact surface 64 of the pocket 36, as well as the contact between the upper interior contact surface 126 and the wheel, facilitates the stability and strength of the attachment of the cutter tooth to the pocket during the cutting operation. In this position one may consider the cutter tooth to be disposed toward the wheel at an included angle (i.e., "y") of about 45 degrees. Further, the upper contact surface of the pocket is disposed a distance "C" below the peripheral edge of the wheel.

Figure 17:
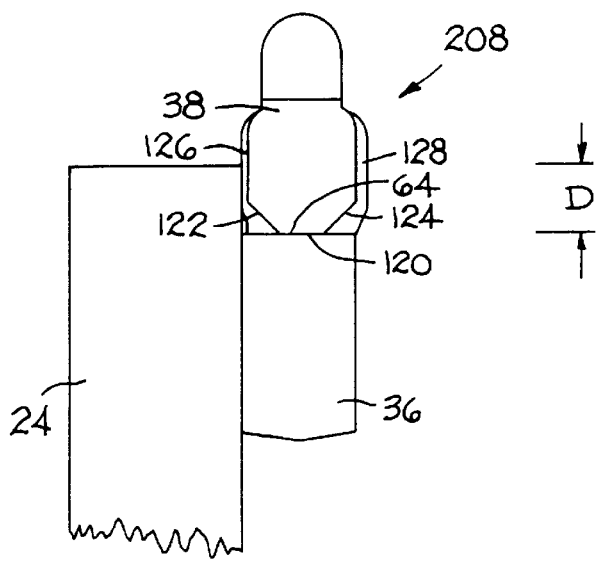
FIG. 17 is mechanical schematic front view depicting the stump cutter assembly attached to the wheel wherein the cutter tooth is indexed so as to be in a neutral position with respect to the wheel and wherein the stump cutter assembly is positioned so that the upper contact surface of the pocket is positioned the second least distance below the peripheral edge of the cutter wheel of the set of five stump cutter assemblies depicted in FIG. 14.

FIG. 17 illustrates the stump cutter tooth assembly 208. The stump cutter tooth 38 in a position wherein the bottom contact surface 120 contacts against the upper contact surface 64 of the pocket 36. The contact between the bottom contact surface 120 of the cutter tooth and the upper contact surface 64 of the pocket 36, as well as the contact between the upper interior contact surface 126 and the wheel, enhances the stability and strength of the attachment of the cutter tooth to the pocket during the cutting operation. In this position, one may consider the cutter tooth to be in a neutral position with respect to the wheel. The upper contact surface of the pocket is disposed a distance "D" below the peripheral edge of the wheel.

Figure 18:
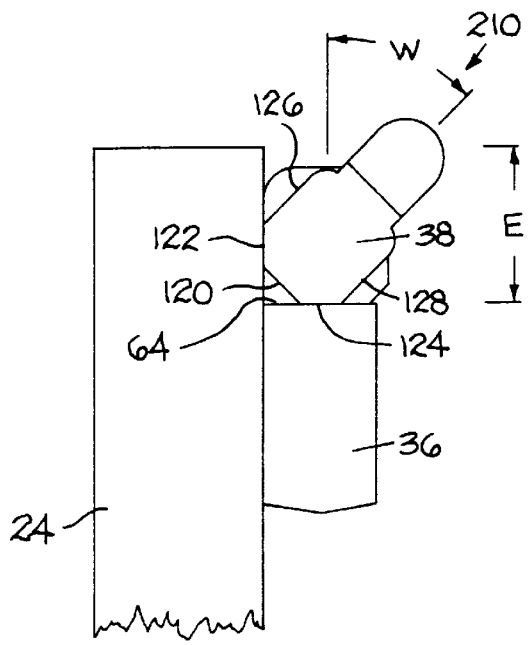
FIG. 18 is a mechanical schematic front view depicting the stump cutter assembly attached to the wheel wherein the cutter tooth is indexed at an angle "w" of about 45 degrees away from the wheel and wherein the stump cutter assembly is positioned so that the upper contact surface of the pocket is positioned the third least distance below the peripheral edge of the cutter wheel of the set of five stump cutter assemblies depicted in FIG. 14.

FIG. 18 illustrates the stump cutter tooth assembly 210. The stump cutter tooth 38 in a position wherein the lower exterior contact surface 124 is in contact with the upper contact surface 64 of the pocket 36. In this position, the transverse axis of the cutter tooth 38 is disposed at angle of "w" about 45 degrees with respect to the surface of the wheel (or the vertical as shown in the drawing). The contact between the lower exterior contact surface 124 of the cutter tooth 38 and the upper contact surface 64 of the pocket 36, as well as the contact between the lower interior contact surface 122 and the wheel, facilitates the stability and strength of the attachment of the cutter tooth to the pocket during the cutting operation. In this position one may consider the cutter tooth to be disposed away from the wheel at an included angle (i.e., "w") of about 45 degrees. The upper contact surface of the pocket is positioned a distance "E" below the peripheral edge of the wheel.

Figure 19:
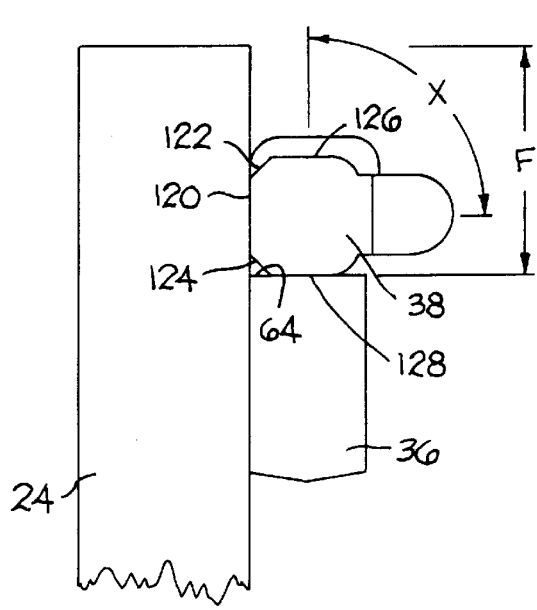
FIG. 19 is a mechanical schematic front view depicting of the stump cutter assembly attached to the wheel wherein the cutter tooth is indexed at an angle "x" of about 90 degrees away from the wheel and wherein the stump cutter assembly is positioned so that the upper contact surface of the pocket is positioned the greatest distance below the peripheral edge of the cutter wheel of the set of five stump cutter assemblies depicted in FIG. 14.

FIG. 19 illustrates the stump cutter tooth 38 in a position wherein the upper exterior contact surface 128 is in contact with the upper contact surface 64 of the pocket 36. In this position, the transverse axis of the cutter tooth 38 is disposed at angle of "x" about 90 degrees with respect to the surface of the wheel (or the vertical as shown in the drawing). The contact between the upper exterior contact surface 128 of the cutter tooth 38 and the upper contact surface 64 of the pocket 36, as well as the contact between the bottom contact surface 120 and the wheel, facilitates the stability and strength of the attachment of the cutter tooth to the pocket during the cutting operation. In this position one may consider the cutter tooth to be disposed away from the wheel at an included angle (i.e., "x") of about 90 degrees. The upper contact surface of the pocket is disposed a distance "F" below the peripheral edge of the wheel. In regard to the magnitude of these distances, they follow the following relationship: C <D<E<F.

It is thus apparent that the instant invention provides the advantage of being able to index the stump cutter tooth with respect to the pocket. By being able to index the stump cutter tooth with respect to the pocket, the operator may be able to adjust the stump cutter assembly to accommodate a variety of specific cutting situations. For example, the ability to index the cutter tooth over the wheel, which are the positions illustrated in FIGS. 15 and 16, is especially useful for making a so-called plunge cut into the stump.

Figure 3:
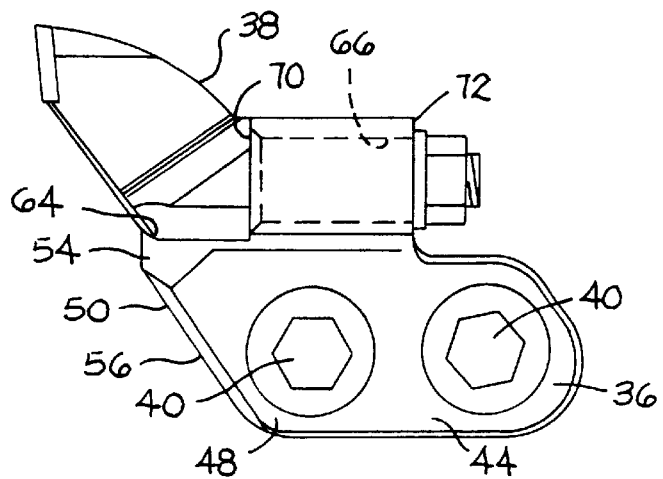
FIG. 3 is a side view of the stump cutter assembly of FIG. 2 showing the stump cutter tooth retained to the pocket.

Referring to FIG. 3, there is shown the cutter tooth in a position wherein the hard insert is circumferentially past (or axially forward of) the remainder of the cutter bit assembly including the pocket. This position may be considered to be a cab-forward position of the cutter tooth with respect to the pocket. When in this so-called cab-forward orientation, the cutter tooth first engages the stump thereby keeping the pocket out of the stump so as to increase the overall efficiency of the stump cutting operation. This cab-forward design also provides for the increased clearance between the cutter tooth and the pocket and the wheel, and hence, provides for better passage of the wood chips away from the cutter tooth assembly.

As shown in FIG. 1 and FIG. 14, the stump cutter tooth assembly is attached to the wheel in such a fashion so that the central axis of the cutter tooth is generally tangential to circumferential edge of the wheel. When in this position, the stump cutter tooth has an orientation so that the cutting forces are generally parallel to the central longitudinal axis of the shank of the cutter tooth. Furthermore, each stump cutter tooth assembly has an orientation such that the leading face of the hard insert lies along a line (R—R) coaxial with the radius of the wheel (see FIG. 1).

The stump cutter tooth has a bevelled (or chamfered) leading face which provides for the deflection of debris from the stump cutting operation. By providing this deflection, there is an improvement in the overall efficiency of the cutting operation.

The cutter tooth may also present a hard insert that has a bevelled (or chamfered) rearward face which provides for maximum cutting potential when the cutter tooth is indexed either toward or away from the wheel. Such a design permits the use of one hard (carbide) insert for both cuts wherein the stump cutter tooth is positioned away from the wheel or toward the wheel or neutral with respect to the wheel. In other words, the hard insert is suitable to perform all three (i.e., away from the wheel, toward the wheel, and neutral with respect to the wheel) types of cuts.

The pocket has a leading face which has a bevelled (or chamfered) face which also provides for the deflection of debris from the cutting operation. By providing this debris deflection, there is an improvement in the overall efficiency of the cutting operation.

Another advantages which are present in the instant invention providing a cutter tooth shank which has improved strength.

Another advantage with the instant invention is a pocket which provides for an increase in the bearing area between the pocket and the wheel. Such a bearing area results in a decrease in the deformation of the wheel during the stump grinding operation.

Still another advantage of the instant invention is the ability to provide for the quick and easy replacement of the cutter tooth due to the use of a nut threaded onto the threaded portion of the shank to attach the cutter tooth to the pocket.

It should be appreciated that although the specific embodiment depicts an indexable tooth applicant, contemplates that a non-indexable tooth is within the scope of the invention. Furthermore, although the tooth shown in the specific embodiment is indexable to five discrete positions, applicant contemplates that a tooth indexable to a number of positions other than five is within the scope of the invention.

The patents and other documents identified herein are hereby incorporated by reference herein.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. A cutter tooth assembly for impinging a material and wherein the cutter tooth assembly is attachable to a driven member wherein the driven member has a side surface and a circumferential surface, the assembly comprising:
    a cutter tooth having an elongate body with a leading end and a trailing end, and a hard insert at the leading end of the tooth;
    a pocket including a base portion and a holder portion, the pocket being attachable to the side surface of the driven member at the base portion thereof, and the cutter tooth being retained to the pocket at the holder portion thereof;
    the base portion of the pocket having a leading surface and a trailing surface; and
    the cutter tooth being retained by the holder portion of the pocket so that the hard insert extends circumferentially past the leading surface of the base portion of the pocket.

2. The cutter tooth assembly of claim 1 wherein the hard insert extends past the leading surface of the base portion such a distance that the hard insert first impinges the material so as to generate debris.

3. The cutter tooth assembly of claim 1 wherein the leading surface of the pocket includes at least one bevelled portion so as to deflect debris away from the pocket.

4. The cutter tooth assembly of claim 3 wherein the leading surface of the pocket presents a plurality of the bevelled portions.

5. The cutter tooth assembly of claim 1 wherein the elongate body of the cutter tooth having a plurality of exposed contact surfaces, and the pocket having an external pocket contact surface.

6. The cutter tooth assembly of claim 5 wherein the cutter tooth is indexable to one of a plurality positions relative to the pocket.

7. The cutter tooth assembly of claim 6 wherein in each one of the positions of the cutter tooth relative to the pocket the pocket contact surface engages the corresponding cutter tooth contact surface.

8. The cutter tooth assembly of claim 7 wherein in at least one of the positions a selected one of the cutter tooth contact surfaces is proximate to the driven member.

9. The cutter tooth assembly of claim 6 wherein the cutter tooth is indexable to at least one position wherein the cutter tooth is oriented toward the driven member and at least one position wherein the cutter tooth is oriented away from the driven member and a position wherein the cutter tooth is oriented neutral with respect to the driven member.

10. The cutter tooth assembly of claim 1 wherein the driven member is a wheel, and the elongate body has a central longitudinal axis, and when the pocket being attached to the side surface of the wheel the central longitudinal axis of the elongate body being generally tangential to the circumferential surface of the wheel.

11. The cutter tooth assembly of claim 10 wherein there being at least a pair of pockets; one of the pockets being attached to the side surface of the wheel so as to be a first distance from the circumferential surface of the wheel; other of the pockets being attached to the side surface of the wheel so as to be a second distance from the circumferential surface of the wheel; and the first distance being unequal to the second distance.

12. A cutter tooth assembly for attachment to a rotatable wheel having a side surface and a circumferential surface, the assembly comprising:
    a cutter tooth having a hard insert;
    a pocket being attachable to the side surface of the wheel, and the pocket retaining the cutter tooth; and
    the cutter tooth being indexable to one of a plurality of selected positions relative to the pocket.

13. The cutter tooth assembly of claim 12 wherein the cutter tooth presents a plurality of exposed contact surfaces, and the pocket presents an external contact surface.

14. The cutter tooth assembly of claim 13 wherein when the cutter tooth is in a selected one of the indexable positions the pocket contact surface engages the corresponding contact surface of the cutter tooth.

15. The cutter tooth assembly of claim 12 wherein when in one indexable position the cutter tooth is oriented toward the wheel, when in another indexable position the cutter tooth is oriented away from the wheel, and when in another indexable position the cutter tooth is oriented in a neutral position with respect to the wheel.

16. The cutter tooth assembly of claim 15 wherein when the cutter tooth is in the indexable position toward the wheel the hard insert is positioned over the circumferential surface of the wheel.

17. The cutter tooth assembly of claim 12 wherein the hard insert presents at least one bevelled surface.

18. The cutter tooth assembly of claim 17 wherein the hard insert presents a plurality of bevelled surfaces.

19. The cutter tooth assembly of claim 12 wherein the pocket includes at least one aperture, and a fastener passing through the aperture so as to engage an aperture in the wheel thereby attaching the pocket to the wheel.

20. The cutter tooth of claim 12 wherein the cutter tooth having an elongate body with a leading end and a trailing end, the hard insert being at the leading end of the elongate body; and a connector assembly at the trailing end of the elongate body.

21. The cutter tooth of claim 20 wherein the connector assembly comprising a threaded portion of the elongate body and a nut wherein the nut being threadedly attachable to the threaded portion.

22. A pocket for holding a cutter tooth which has an exposed contact surface and being attachable to a driven member, the pocket comprising;
   a base portion and a holder portion;
   the pocket being attachable to the driven member at the base portion thereof;
   the holder portion retaining the cutter tooth; and
   the base portion presenting at least one external contact surface which engages the exposed contact surface of the cutter tooth.

23. The pocket of claim 22 wherein the pocket includes a leading surface and a trailing surface, and the leading surface presenting a bevelled surface.

24. The pocket of claim 23 wherein the leading surface presents a plurality of the bevelled surfaces.

* * * * *